United States Patent
Liu et al.

(10) Patent No.: US 8,902,921 B2
(45) Date of Patent: Dec. 2, 2014

(54) METHODS FOR INTER-USER INTERFERENCE INDICATION FEEDBACK AND USAGE IN MU-MIMO WIRELESS SYSTEMS

(75) Inventors: Jianhan Liu, San Jose, CA (US); James June-Ming Wang, San Marino, CA (US); YungPing Hsu, Taipei (TW)

(73) Assignee: Mediatek Singapore Pte Ltd., Singapore (SG)

( * ) Notice: Subject to any disclaimer, the term of this patent is extended or adjusted under 35 U.S.C. 154(b) by 133 days.

(21) Appl. No.: 13/587,902

(22) Filed: Aug. 16, 2012

(65) Prior Publication Data

US 2013/0107916 A1 May 2, 2013

Related U.S. Application Data

(60) Provisional application No. 61/524,109, filed on Aug. 16, 2011.

(51) Int. Cl.
*H04B 7/212* (2006.01)
*H04B 7/04* (2006.01)
*H04L 25/02* (2006.01)

(52) U.S. Cl.
CPC .......... *H04B 7/0452* (2013.01); *H04L 25/0204* (2013.01); *H04L 25/0224* (2013.01)
USPC .......................................... 370/442; 370/338

(58) Field of Classification Search
USPC ......... 370/328–329, 331–336, 338, 340–345, 370/347–348, 432, 437, 441–444, 465, 370/478–480
See application file for complete search history.

(56) References Cited

U.S. PATENT DOCUMENTS

| 8,305,921 | B2 * | 11/2012 | Narasimhan et al. | 370/252 |
| 8,351,455 | B2 * | 1/2013 | Tang et al. | 370/437 |
| 8,553,620 | B2 * | 10/2013 | Ko et al. | 370/328 |
| 8,688,163 | B2 * | 4/2014 | Chen et al. | 455/522 |
| 2007/0280116 | A1 * | 12/2007 | Wang et al. | 370/236 |
| 2008/0089282 | A1 * | 4/2008 | Malladi et al. | 370/329 |
| 2010/0254325 | A1 * | 10/2010 | Narasimhan et al. | 370/329 |
| 2011/0069629 | A1 * | 3/2011 | Breit et al. | 370/252 |
| 2011/0103296 | A1 * | 5/2011 | Ji et al. | 370/315 |
| 2012/0026940 | A1 * | 2/2012 | Barbieri et al. | 370/328 |
| 2012/0057535 | A1 * | 3/2012 | Zhang et al. | 370/329 |
| 2012/0182895 | A1 * | 7/2012 | Jwa | 370/252 |
| 2012/0188976 | A1 * | 7/2012 | Kim et al. | 370/329 |
| 2012/0207099 | A1 * | 8/2012 | Lindh et al. | 370/329 |
| 2012/0275376 | A1 * | 11/2012 | Sampath et al. | 370/328 |
| 2013/0148611 | A1 * | 6/2013 | Moulsley et al. | 370/329 |

* cited by examiner

*Primary Examiner* — Kevin Mew
(74) *Attorney, Agent, or Firm* — Zheng Jin (57) ABSTRACT

The present invention proposes methods for facilitating and improving the performance of MU-MIMO transmission in wireless communication systems. Each user within a MU group inserts an inter-user interference indication field in its acknowledgement packet. The inter-user interference indication field includes signal-to-interference-noise-ratio (SINR) and interference source information. The MU-MIMO transmitter extracts inter-user interference indication feedback and improves subsequent MU-MIMO transmission. Feedback of the inter-user interference information such as SINR and interference source allows efficient link adaptation, smarter user selection, channel re-sounding selection, and fine-tuning of precoding matrix.

20 Claims, 5 Drawing Sheets

(PRIOR ART)

METHODS FOR INTER-USER INTERFERENCE INDICATION FEEDBACK AND USAGE IN MU-MIMO WIRELESS SYSTEMS

CROSS REFERENCE TO RELATED APPLICATIONS

This application claims priority under 35 U.S.C. §119 from U.S. Provisional Application No. 61/524,109, entitled "Methods for Inter-user Interference Indication Feedback and Usage in MU-MIMO Wireless Systems" filed on Aug. 16, 2011, the subject matter of which is incorporated herein by reference.

TECHNICAL FIELD

The disclosed embodiments relate generally to wireless network communications, and, more particularly, to sounding and feedback process in multi-user multiple-input and multiple-output (MU-MIMO) wireless communications systems.

BACKGROUND

Multi-user multiple-input and multiple-output (MU-MIMO) transmission is becoming a new system technique to enable high system capacity in both the upcoming IEEE 802.11ac and the LTE (long-term evolution) standards. As compared to single-user MIMO (SU-MIMO), MU-MIMO has several key advantages. First, MU-MIMO allows for a direct gain in multiple access system capacity proportional to the number of access point antennas. Second, MU-MIMO allows the higher degree spatial multiplexing gain to be obtained without the need for higher number of antennas at the mobile stations by keeping the intelligence and cost at the access point. Third, MU-MIMO appears immune to most propagation limitations plaguing SU-MIMO communications because multi-user diversity can be extracted even in a simple line of sight (LOS) propagation environment. As a result, the LOS propagation, which causes degradation in single user spatial multiplexing schemes, is no longer a problem in the multi-user setting.

While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously. The typical MU-MIMO usage scenario in IEEE 802.11ac involves an access point (AP) or router first acquiring the MIMO channel state information (CSI) through channel sounding, computing and applying transmit beamforming (precoding) weights, and then simultaneously transmitting multiple spatial streams to more than one mobile stations (STAs). With proper transmit beamforming (precoding), partial spatial processing is done at the access point to separate the spatial streams among the multiple users, and the remaining spatial processing is done at the receivers to decode the multiple spatial streams received.

Figure 1:
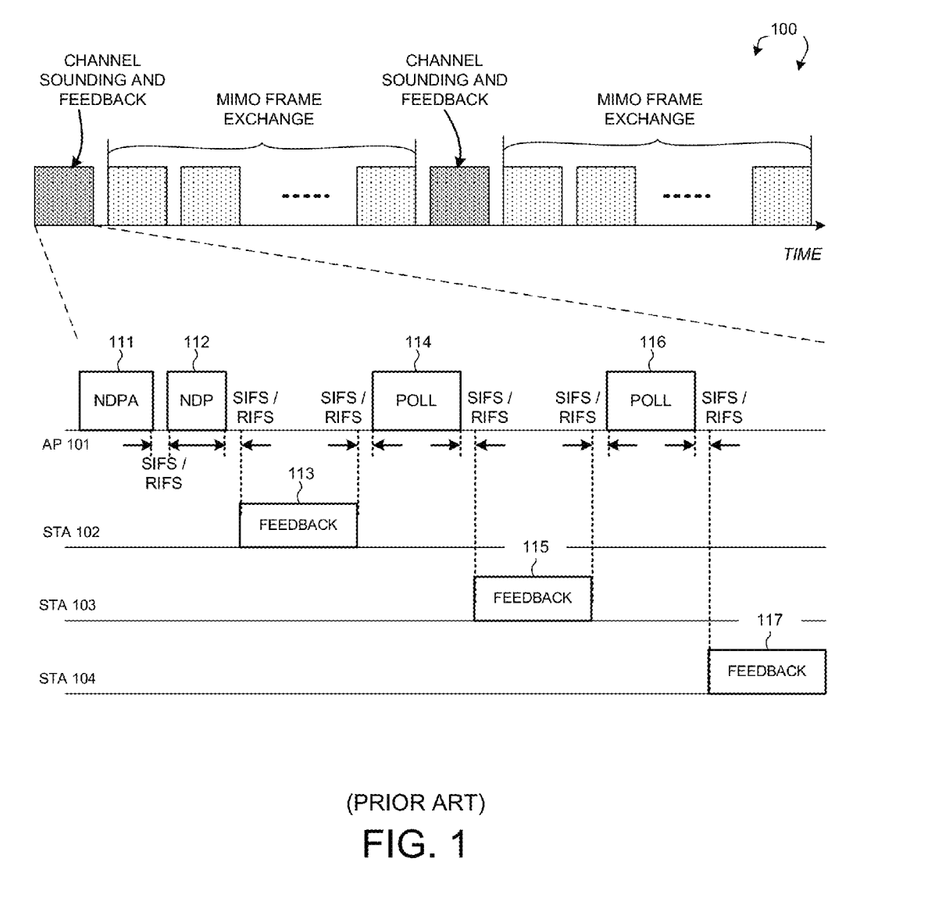
FIG. 1 (prior art) illustrates a channel sounding and feedback process in a MU-MIMO wireless system.

FIG. 1 (prior art) illustrates a MU-MIMO sounding and feedback process in a wireless system 100. Wireless system 100 comprises a transmitting access point AP101 and three receiving stations STA102-104 in one multi-user (MU) group. As illustrated in FIG. 1, each channel sounding and feedback process is followed by a series of MIMO frame exchange. For downlink transmission, AP101 (initiator or beamformer) first broadcasts a sounding announcement (e.g., null data packet announcement (NDPA) 111) to inform the intended stations (responders or beamformees) and a sounding packet (e.g., null data packet (NDP) 112) is then transmitted for the intended responders. Each beamformee estimates the channel during the preamble portion of the sounding packet. For uplink transmission, STA102 transmits feedback message 113 after receiving NDP 112 (with SIFS/RIFS), STA103 transmits feedback message 115 after receiving polling message 114, and STA104 transmits feedback message 117 after receiving polling message 116. The feedback messages contain the CSI (channel state information) and the average SNR (signal-to-noise ratio) to allow the beamformer to compute the transmit antenna (precoding) weights and to apply link adaptation for downlink (DL) MU-MIMO transmission.

Under the current IEEE 802.11ac sounding protocol, the sounding packet NDP is un-beamformed (e.g., not MU-MIMO pre-coded). Therefore, the channel information and SNR in compressed beamforming feedback report does not include inter-user or inter-STA interference or leakage among the multi-user group. The actual signal-to-interference-noise-ratio (SINR) (including the inter-user interference) during MU-MIMO transmission can be much smaller than the SNR feedback in the sounding and feedback process. Inter-user interference in MU-MIMO can be introduced by channel estimation errors, channel variations, or channel aging. Lack of knowledge for the inter-user interference and the interference source at AP side may lead to wrong modulation and coding scheme (MCS) selection for MU-MIMO transmission. This is because the interference power can be much larger than the noise power especially when SNR is high. For example, if the SNR at STA101 is 20 dB and the leaking interference power is 10% of the signal power, then the SINR became 10 dB, which may lead to three MCS level difference in making MCS selection. Lack of knowledge for the inter-user interference and interference source at AP side may also lead to unnecessary channel resounding and inaccurate MU group selection. Re-sounding overhead is significant because of channel feedback. A solution is sought.

SUMMARY

The present invention proposes methods for facilitating and improving the performance of MU-MIMO transmission in wireless communication systems. Each user within a MU group inserts an inter-user interference indication field in its acknowledgement packet. The inter-user interference indication field includes signal-to-interference-noise-ratio (SINR) and interference source information. The MU-MIMO transmitter extracts inter-user interference indication feedback and improves subsequent MU-MIMO transmission. Feedback of the inter-user interference information such as SINR and interference source allows efficient link adaptation, smarter user selection, channel re-sounding selection, and fine-tuning of precoding matrix.

In one embodiment, the inter-user interference indication is inserted in a control field of a Block Acknowledgement (BA) frame. In one example, the inter-user interference indication contains a four-bit average SINR or average delta SINR field, as well as a two-bit largest interference source (LIS) field. The LIS field contains a user ID that corresponds to the largest interference source in the MU group. In another example, the inter-user interference indication contains a four-bit average SINR or average delta SINR field, as well as a one-bit indication on whether the inter-user interference is dominant over noise. In another embodiment, the inter-user interference indication is inserted in the frame body of a feedback frame (e.g., a management frame or action frame).

The inter-user interference indication contains an average SINR and SINR metrics of each user (except the target user itself) in the MU group.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

A multiple-input and multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S <= \min\{N_T, N_R\}$. The $N_S$ spatial channels are used to transmit $N_S$ independent data streams to achieve greater overall throughput. While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously.

Figure 2:
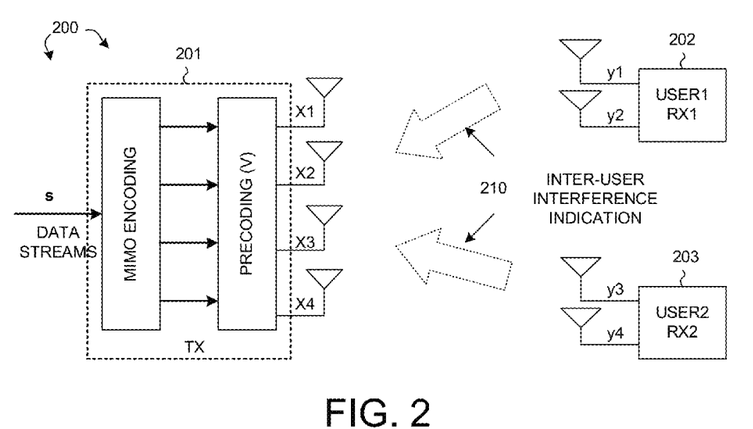
FIG. 2 illustrates a wireless communication system with inter-user interference indication feedback in accordance with one novel aspect.

FIG. 2 illustrates a MU-MIMO wireless system 200 with inter-user interference indication feedback in accordance with one novel aspect. Wireless system 200 comprises an access point AP 201 (TX), a first mobile station STA 202 (user 1 or RX1), and a second mobile station STA 203 (user 2 or RX2). The input-output relationship can be described as:

$x = Vs$ $y = Hx + n$ where
s is a vector of input data symbols
x is a vector to be sent from transmit antennas after applying precoding matrix V
V is the precoder matrix, which can be derived from channel response matrix H
H is the channel response matrix
n is the noise
y is a vector to be received by receive antennas In the example of FIG. 2, four spatial streams are transmitted by the TX antennas with two spatial streams intended for each receiver. The goal of transmit beamforming (precoding) is to generate desired transmit array antenna patterns such that two spatial streams are beamed toward the first receiver (RX1) while nulled toward the second receiver (RX2) and that the other two spatial streams are beamed toward the second receiver (RX2) while nulled toward the first receiver (RX1). In other words, if precoder matrix V is applied properly, then RX1 will only see the first two spatial streams and RX2 will only see the other two spatial streams. As a result, RX1 only needs two antennas to resolve the first two spatial streams while RX2 also only needs two antennas to resolve the other two spatial streams. With the proper transmit beamforming at the transmitter (TX), the overall receive antennas can be reduced from eight to four and a simpler system configuration can be achieved. In order to apply MU-MIMO beamforming (precoding), the AP is required to have the knowledge of the channel response matrix H. This requires the receiving stations to measure and estimate the channel response matrix H and then feedback the channel response matrix H to the transmitting station via sounding and feedback process.

For example, during channel sounding, AP 201 sends a sounding packet (e.g., a null data packet (NDP)) to STA 202 and STA 203. Each user estimates the channel during the preamble portion of the sounding packet, and then feedbacks the average SNR (signal-to-noise ratio) and CSI (channel state information) to allow AP 201 to compute the transmit antenna (precoding) weights for MU-MIMO transmission. Under the current IEEE 802.11ac sounding protocol, however, the sounding packet is un-beamformed (e.g., not MU-MIMO pre-coded). Therefore, the channel information and SNR in compressed beamforming feedback report does not include inter-user or inter-STA interference or leakage among the multi-user group. Inter-user interference in MU-MIMO can be introduced by channel estimation errors, channel variations, or channel aging. Lack of knowledge for the inter-user interference and the interference source at AP side may lead to wrong modulation and coding scheme (MCS) selection for MU-MIMO transmission. Lack of knowledge for the inter-user interference and interference source at AP side may also lead to more frequent channel resounding and inaccurate MU group selection.

While the AP does not know the inter-user interference information via the channel sounding and feedback process, the inter-user interference metrics can be calculated by each STA via DL MU-MIMO transmission. Based on the resolvable LTFs (Long Training Fields) contained in each downlink packet, each STA is able to calculate the inter-user interference metrics. In current IEEE 802.11ac spec, however, inter-interference metrics is calculated and then abandoned by an STA, if the STA has no interference suppression capability.

In one novel aspect, dealing with inter-user or inter-STA interference is not put on the STAs only. The AP also has the capability to alleviate performance degradation caused by inter-STA interference. Feedback of inter-user interference information allows the AP to make adjustment and reduce inter-user interference, especially when an STA does not have interference suppression capability. In one embodiment, as illustrated in FIG. 2, each user or station within the multi-user MU group inserts an inter-user interference indication field (e.g., as depicted by 210) in an acknowledgement packet. The inter-user interference indication field includes SINR and interference source. Upon receiving the acknowledgement from the different users, AP 201 extracts the inter-user interference indication feedback to improve the system performance for MU-MIMO transmission.

Figure 3:
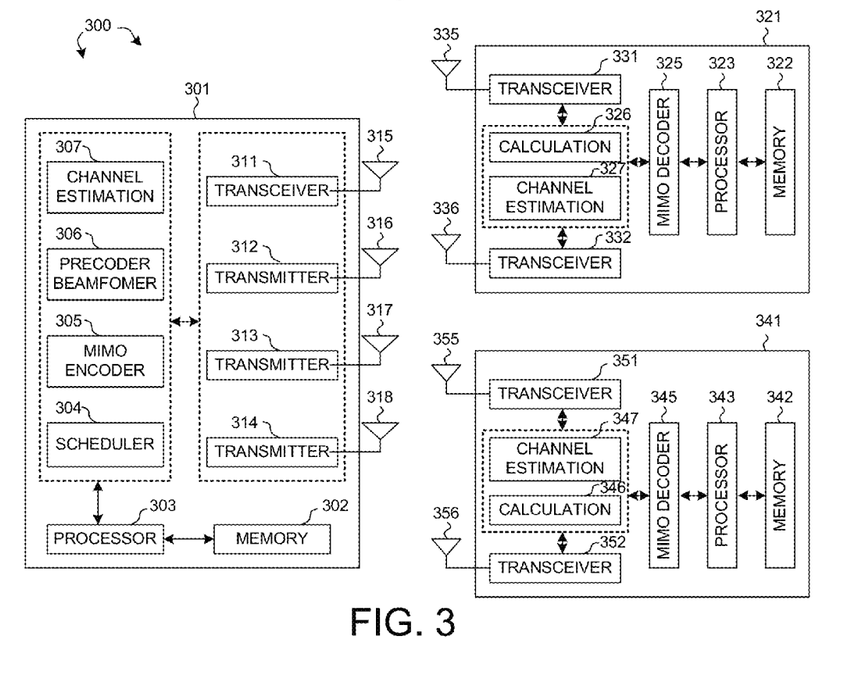
FIG. 3 illustrates simplified block diagrams of an access point and two stations in a wireless communication system in accordance with one novel aspect.

FIG. 3 illustrates simplified block diagrams of an access point AP 301 and two mobile stations STA 321 and STA 341 in a wireless system 300 in accordance with one novel aspect. AP 301 comprises memory 302, a processor 303, a scheduler 304, a MIMO encoder 305, a beamformer/precoder 306, a channel estimation module 307, and a plurality of transceivers 311-314 coupled to a plurality of antennas 315-318, respectively. STA 321 comprises memory 322, a processor 323, a MIMO decoder 325, a calculation module 326, a channel estimation module 327, and a plurality of transceivers 331-332 coupled to a plurality of antennas 335-336, respectively. Similarly, STA 341 comprises memory 342, a processor 343, a MIMO decoder 345, a calculation module 346, a channel estimation module 347, and a plurality of transceivers 351-352 coupled to a plurality of antennas 355-356, respectively.

The various modules are function modules and may be implemented by software, firmware, hardware, or any combination thereof. The function modules, when executed by processors 303, 323, and 343 (e.g., via program instructions contained in memory 302, 322, and 342), interwork with each other to allow AP301 and STAs 321 and 341 to perform channel sounding and feedback for MU-MIMO transmission. For example, based on downlink MU-MIMO transmission, STA 321 and STA 341 calculate the inter-user interference metrics and feedback the information to AP301. AP301 is then able to extracts the inter-user interference indication feedback to improve the system performance for subsequent MU-MIMO transmission.

Figure 4:
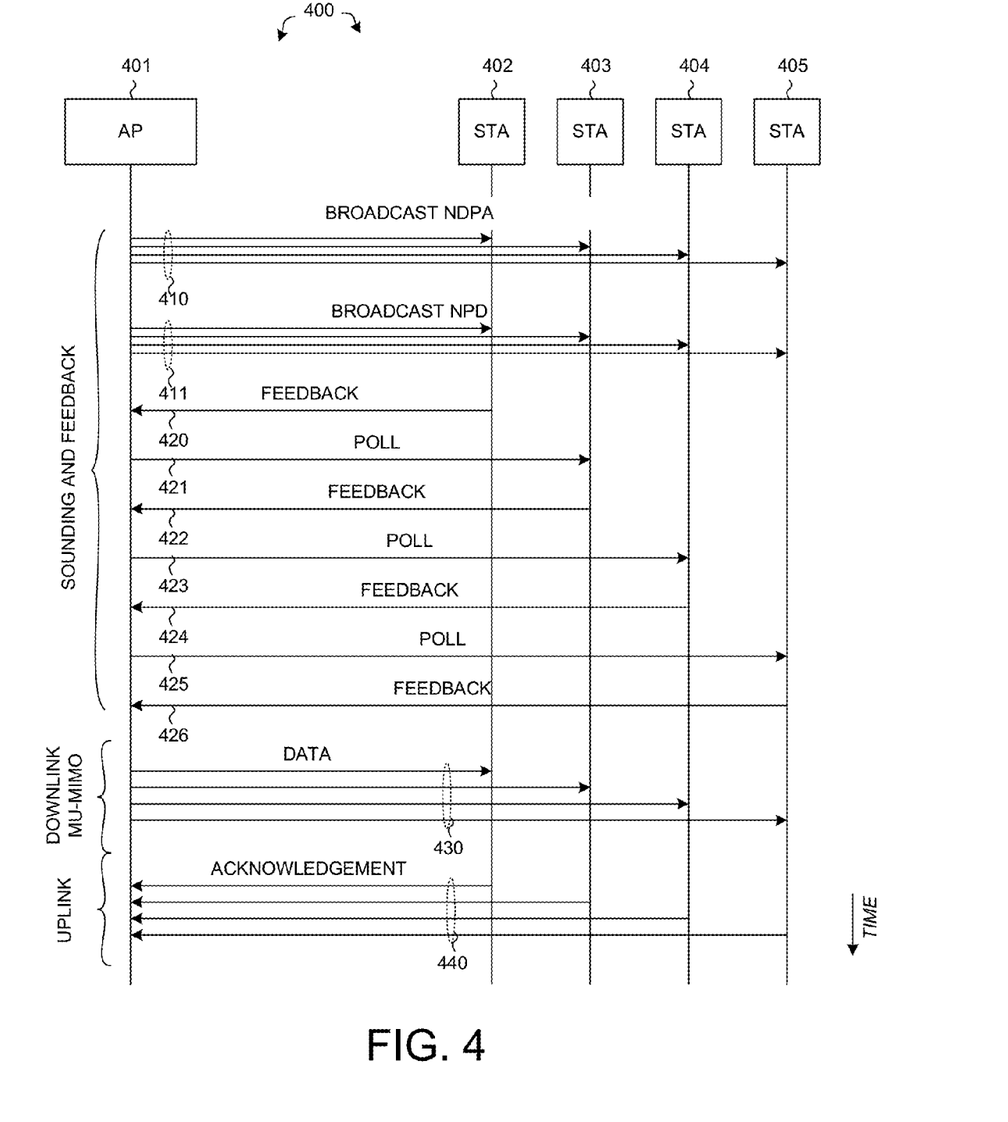
FIG. 4 illustrates a MU-MIMO scheme of providing inter-user interference indication feedback in a MU-MIMO wireless communication system.

FIG. 4 illustrates a MU-MIMO scheme of providing inter-user interference indication feedback in a MU-MIMO wireless communication system 400. Wireless communication system 400 comprises a transmitting device AP401 and four receiving devices STAs 402-405 in a multi-user group. For channel sounding, AP401 (initiator or beamformer) first broadcasts a sounding announcement (e.g., null data packet announcement (NDPA)) to inform all the intended stations (responders or beamformees STAs 402-405) in the MU group (step 410), followed by a sounding packet (e.g., null data packet (NDP)) transmitted to all the intended responders (step 411). Each beamformee estimates the channel during the preamble portion of the sounding packet and then starts to provide channel feedback. For example, in step 420, STA402 transmits a feedback message after receiving the NDP. In step 421, AP401 polls STA403, which in response transmits a feedback message in step 422. In step 423, AP401 polls STA404, which in response transmits a feedback message in step 424. Finally, in step 425, AP401 polls STA405, which in response transmits a feedback message in step 426. The feedback messages contain the CSI and the average SNR to allow AP401 to apply precoding and to apply link adaptation for MU-MIMO transmission.

After the channel sounding and feedback process, MU-MIMO transmission can be started. In step 430, AP401 transmits downlink packets to each of the STAs 402-405 using MU-MIMO scheme based on the sounding feedback. Upon receiving the downlink packets, each STA calculates the inter-user interference metrics using the LTFs contained in the downlink data packets. In step 440, each STA transmits a block acknowledgement (BA) frame back to AP401 in response to the received downlink packet. The BA frame contains the calculated inter-user interference metrics such that AP401 can use the information for subsequent MU-MIMO transmission.

Figure 5A:
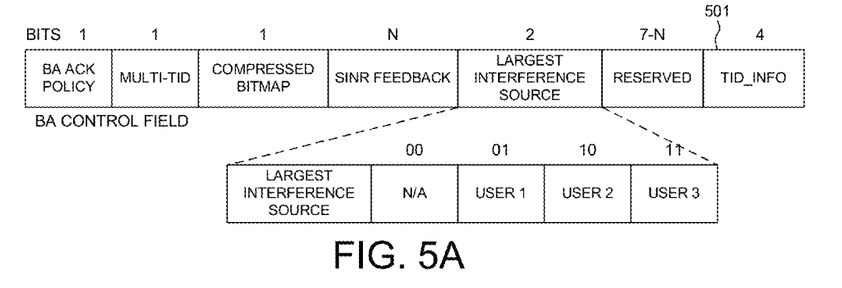
FIG. 5A illustrates a first embodiment of providing inter-user interference indication feedback through a block acknowledgement.

FIG. 5A illustrates a first embodiment of providing inter-user interference indication feedback through a block acknowledgement. As illustrated by block 501 in FIG. 5A, the inter-user interference indication feedback includes an n-bit SINR feedback field, plus a two-bit field indicating the largest interference source (LIS) in the MU group, both contained in BA control field 501. In one example, the inter-user interference is indicated by a four-bit delta SINR feedback, which is defined as:

$$\Delta SINR = \begin{cases} \min(\text{round}(SNR - SINR), 14), & \text{if } SNR > SINR \\ 0, & \text{otherwise} \end{cases}$$

where
SINR is the average SINR over all subcarriers and spatial streams
SNR is the average SNR over all subcarriers and spatial streams If the SINR feedback is represented by MU_INT (B1 to B4), then the four bits B1 to B4 indicate 0-14 dB delta SINR of delta SINR in one dB step. MU_INT (B1 to B4)='0000' represents no information provided. Otherwise, MU_INT (B1 to B4)=ΔSINR+1.

In the example, the two-bit LIS field has four values. A value of '00' indicates no information on LIS, and other three values correspond to the user position in the MU group after excluding itself. For example, a value of '01' indicates LIS is the STA in the first position (user 1) within the MU group except the STA itself, a value of '10' indicates LIS is the STA in the second position (user 2) within the MU group except the STA itself, and a value of '11' indicates LIS is the STA in the third position (user 3) within the MU group except the STA itself.

Figure 5B:
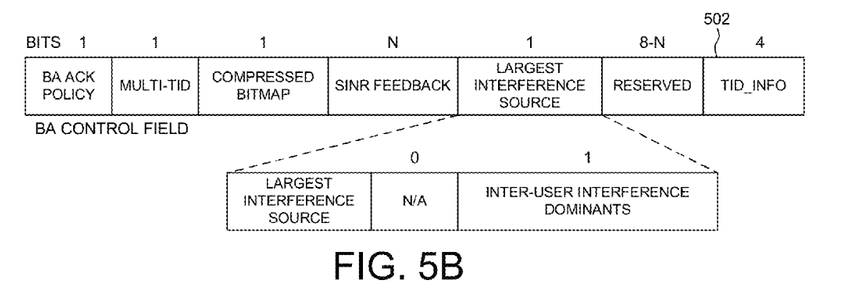
FIG. 5B illustrates a second embodiment of providing inter-user interference indication feedback through a block acknowledgement.

FIG. 5B illustrates a second embodiment of providing inter-user interference indication feedback through a block acknowledgement. The second embodiment is similar to the first embodiment, where the inter-user interference indication feedback contains an n-bit SINR feedback field, plus a one-bit field indicating interference source in the MU group, both contained in BA control field 502. In the example of FIG. 5B, the one-bit LIS field has only two values. A value of '0' indicates that inter-user interference is small as compared to noise (or no information provided for inter-user interference), and a value of '1' indicates that the inter-user interference is dominant.

Figure 5C:
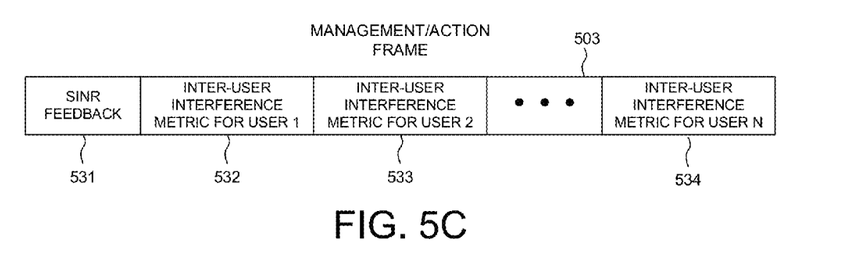
FIG. 5C illustrates a third embodiment of providing inter-user interference indication feedback through a management/action frame.

FIG. 5C illustrates a third embodiment of providing inter-user interference indication feedback through a new management or action frame. In the example of FIG. 5C, block 503 indicates a new management/action frame, which carries the inter-user interference feedback information. The new management/action frame 503 contains average SINR plus inter-user interference metric of each user (except the target user itself). For example, field 531 indicates an average SINR feedback from all other interfering users, field 532 indicates an inter-user interference metric of user 1, field 533 indicates an inter-user interference metric of user 2 . . . , and field 534 indicates an inter-user interference metric of user N. Each of the inter-user interference metrics may be represented by the average SINR over all subcarriers, by SINRs over each subcarrier, or by group SINRs over groups of selected subcarriers, etc.

In accordance with one novel aspect, the inter-user interference indication can be used to assist MU-MIMO transmission at AP side by applying the following techniques. First, efficient link adaptation can be achieved by using the SINR feedback. Link adaptation technique can adapt MCS according to time-varying channel conditions to increase throughput of the wireless system. Because SINR indicates the true channel condition at the receiving stations, fast convergence to the best MCS selection can be achieved by the AP.

Second, smart user selection can be achieved by combining the SINR and the largest interference source (LIS) feedback. For example, when one user bring interference to other users and its SINR is low, or one user is indicated as the LIS, the AP can exclude that specific user from the MU group by setting its $N_{STS}=0$ within the MU-MIMO transmission.

Third, fine-tuning of the MU-MIMO precoding matrix can be performed. AP can use the combined SINR and LIS feedback to perform user power allocation. For example, AP can reduce the power allocated to a user who has high SINR and brings interference to other users, and increases the power to a user who has low SINR. User power allocation (not TPC) during MU-MIMO transmission is completely transparent to receivers.

Fourth, smart channel re-sounding selection can be achieved. AP can decide whether the channel measurement is still adequately accurate and decide which user needs channel re-sounding based on the SINR and LIS feedback. For example, if the SINR is below a threshold value for one user, then channel re-sounding may be selected for that user to limit overhead.

Figure 6:
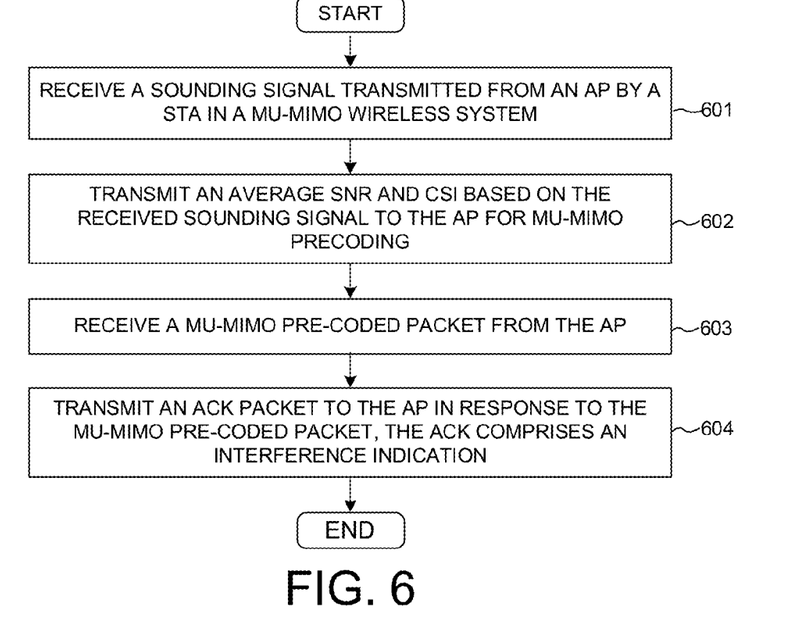
FIG. 6 is a flow chart of a method of providing inter-user interference indication feedback in a MU-MIMO wireless communication system.

FIG. 6 is a flow chart of a method of providing inter-user interference indication feedback in a MU-MIMO wireless communication system. In step 601, a mobile station (STA) receives a sounding signal transmitted from an access point (AP) in a MU-MIMO wireless system. In step 602, the STA performs channel estimation and transmits channel feedback information based on the received sounding signal to the AP for MU-MIMO precoding. In step 603, the STA receives a MU-MIMO precoded packet from the AP. In step 604, the STA calculates inter-user interference based on the MU-MIMO pre-coded packet, and in response transmits an acknowledgement packet to the AP. The acknowledgment comprises an inter-user interference indication containing SINR and interference source information.

Figure 7:
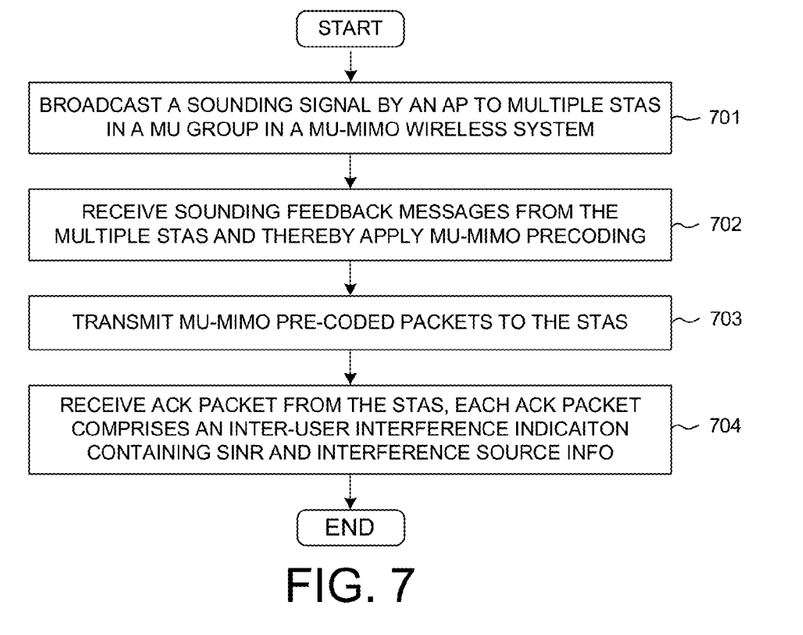
FIG. 7 is a flow chart of a method of utilizing inter-user interference indication feedback in a MU-MIMO wireless communication system.

FIG. 7 is a flow chart of a method of utilizing inter-user interference indication feedback in a MU-MIMO wireless communication system. In step 701, an access point (AP) broadcasts a sounding signal to a group of mobile stations (STAs) in a multi-user (MU) group in a MU-MIMO wireless system. In step 702, the AP receives sounding feedback messages from the STAs and thereby applying MU-MIMO precoding. In step 703, the AP transmits MU-MIMO pre-coded packets to the group of STAs. In step 704, the AP receives acknowledgment packets from the STAs. The acknowledgement packets comprise inter-user interference indication containing SINR and interference source information. The AP extracts the SINR and interference source information for link adaptation, user selection, channel re-sounding selection, and fine-tuning of precoding matrix.

In one exemplary embodiment, the proposed method is applied in a MU-MIMO system with a four-antenna AP. The AP transmits one spatial stream each to four users, and each user has two receiving antennas. In such a system, the physical channel of the m-th subcarrier between the k-th user and the m-th user is:

$$\begin{bmatrix} h_{k,1,1}(m) & h_{k,1,2}(m) & h_{k,1,3}(m) & h_{k,1,4}(m) \\ h_{k,2,1}(m) & h_{k,2,2}(m) & h_{k,2,3}(m) & h_{k,2,4}(m) \end{bmatrix}$$

The received MU-MIMO pre-coded signal $$\begin{bmatrix} y_{k,1}(m) \\ y_{k,2}(m) \end{bmatrix}$$

of m-th subcarrier at the k-th user is:

$$\begin{bmatrix} y_{k,1}(m) \\ y_{k,2}(m) \end{bmatrix} = \begin{bmatrix} H_{k,1}(m) & H_{k,2}(m) & H_{k,3}(m) & H_{k,4}(m) \end{bmatrix} \begin{bmatrix} s_1(m) \\ s_2(m) \\ s_3(m) \\ s_4(m) \end{bmatrix} + \begin{bmatrix} n_{k,1}(m) \\ n_{k,2}(m) \end{bmatrix}$$

where $H_{k,j}(m)$ is the equivalent channel of m-th subcarrier (seen by the k-th user) including pre-coding matrix for j-th user defined as:

$$H_{k,j}(m) = \begin{bmatrix} h_{k,1,1}(m) & h_{k,1,2}(m) & h_{k,1,3}(m) & h_{k,1,4}(m) \\ h_{k,2,1}(m) & h_{k,2,2}(m) & h_{k,2,3}(m) & h_{k,2,4}(m) \end{bmatrix} V_j$$

where $V_j$ is the pre-coding matrix for the j-th user. The k-th user can estimate and resolve the equivalent channels denoted as:

$$\hat{H}_k(m) = [\hat{H}_{k,1}(m) \hat{H}_{k,2}(m) \hat{H}_{k,3}(m) \hat{H}_{k,4}(m)]$$

Suppose the equalization matrix is $W_k(m)$ that includes interference suppression, the interference brought by the j-th user to the k-th user is the k-th element of $W_k(m)\hat{H}_{k,j}(m)$ and the interference signal strength brought by the j-th user to the k-th can be defined as:

$$\|W_k(m)\hat{H}_{k,j}(m)\|^2$$

The inter-user interference metric can be defined as a function of the interference signal strength $\|W_k(m)\hat{H}_{k,j}(m)\|^2$, for example, it can be the average of the interference signal strength over all subcarriers.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a sounding signal transmitted from an access point (AP) by a mobile station in a multi-user multiple-input and multiple-output (MU-MIMO) wireless system;
   transmitting an average signal-to-noise-ratio (SNR) and channel state information (CSI) based on the received sounding signal to the AP for MU-MIMO precoding;
   receiving a MU-MIMO pre-coded packet from the AP; and
   transmitting an acknowledgment packet to the AP in response to the MU-MIMO pre-coded packet, wherein the acknowledgment packet comprises an inter-user interference indication.

2. The method of claim 1, wherein the inter-user interference indication comprises signal-to-interference-noise-ratio (SINR) information.

3. The method of claim 1, wherein the inter-user interference indication comprises interference source information in a multi-user (MU) group.

4. The method of claim 3, wherein the interference source information contains a user ID that corresponds to the largest interference source among the MU group.

5. The method of claim 3, wherein the interference source information contains an indication of whether the inter-user interference is dominant over noise.

6. The method of claim 1, wherein the inter-user interference indication is inserted in a control field of a Block Acknowledgment (BA) frame.

7. The method of claim 1, wherein the inter-user interference indication is inserted in a management/action frame, and wherein the inter-user interference indication contains an average signal-to-interference-noise-ratio (SINR) and SINR metrics of other users in a multi-user group.

8. A mobile station (STA), comprising:
a receiving module that receives a sounding signal transmitted from an access point (AP) in a multi-user multiple-input and multiple-output (MU-MIMO) wireless system;
a channel estimation module that determines an average signal-to-noise ratio (SNR) and channel state information (CSI) based on the received sounding signal for MU-MIMO precoding; and
a transmitting module that transmits an acknowledgment packet to the AP in response to a received MU-MIMO pre-coded packet, wherein the acknowledgment packet comprises an inter-user interference indication.

9. The STA of claim 8, wherein the inter-user interference indication comprises signal-to-interference-noise-ratio (SINR) information.

10. The STA of claim 8, wherein the inter-user interference indication comprises interference source information in a multi-user group.

11. The STA of claim 10, wherein the interference source information contains a user ID that corresponds to the largest interference source among the MU group.

12. The STA of claim 10, wherein the interference source information contains an indication of whether the inter-user interference is dominant over noise.

13. The STA of claim 8, wherein the inter-user interference indication is inserted in a control field of a Block Acknowledgment (BA) frame.

14. The STA of claim 8, wherein the inter-user interference indication is inserted in a management/action frame, and wherein the inter-user interference indication contains an average signal-to-interference-noise-ratio (SINR) and SINR metrics of other users in a multi-user group.

15. A method, comprising:
broadcasting a sounding signal by an access point (AP) to multiple stations of a multi-user (MU) group in a multi-user multiple-input and multiple-output (MU-MIMO) wireless system;
receiving sounding feedback messages from the multiple stations and thereby applying MU-MIMO precoding;
transmitting MU-MIMO pre-coded packets to the multiple stations; and
receiving acknowledgement packets from the multiple stations, wherein each acknowledgement packet comprises an inter-user interference indication containing signal-to-interference-noise-ratio (SINR) information and interference source information.

16. The method of claim 15, wherein the inter-user interference indication is inserted in a control field of a Block Acknowledgment (BA) frame.

17. The method of claim 15, wherein the AP uses the inter-user interference indication for link adaptation.

18. The method of claim 15, wherein the AP uses the inter-user interference indication for user selection.

19. The method of claim 15, wherein the AP uses the inter-user interference indication for pre-coding matrix fine-tuning.

20. The method of claim 15, wherein the AP uses the inter-user interference indication for channel re-sounding selection.

* * * * *